US009562500B2

(12) United States Patent
McAlister

(10) Patent No.: US 9,562,500 B2
(45) Date of Patent: Feb. 7, 2017

(54) INJECTOR-IGNITER WITH FUEL CHARACTERIZATION

(71) Applicant: McAlister Technologies, LLC, Phoenix, AZ (US)

(72) Inventor: Roy Edward McAlister, Phoenix, AZ (US)

(73) Assignee: McAlister Technologies, LLC, Phoenix, AZ (US)

(*) Notice: Subject to any disclaimer, the term of this patent is extended or adjusted under 35 U.S.C. 154(b) by 0 days.

(21) Appl. No.: 13/837,214

(22) Filed: Mar. 15, 2013

(65) Prior Publication Data
US 2014/0261303 A1   Sep. 18, 2014

(51) Int. Cl.
| F02M 25/00 | (2006.01) |
| F02M 25/12 | (2006.01) |
| F02M 57/06 | (2006.01) |
| F02D 19/08 | (2006.01) |
| F02M 21/02 | (2006.01) |

(Continued)

(52) U.S. Cl.
CPC .............. *F02M 25/12* (2013.01); *F02D 19/08* (2013.01); *F02D 41/0027* (2013.01); *F02M 21/026* (2013.01); *F02M 21/0206* (2013.01); *F02M 21/06* (2013.01); *F02M 57/06* (2013.01); *Y02T 10/32* (2013.01); *Y02T 10/36* (2013.01)

(58) Field of Classification Search
CPC .... F02M 25/12; F02M 21/0206; F02M 21/06; F02M 21/026; F02M 57/06; F02D 41/0027; F02D 19/08; Y02T 10/32; Y02T 10/36

USPC .... 123/1 A, 304, 486, 575–578, 25 A, 25 E, 123/25 M; 477/107, 110; 701/101, 102, 701/103, 104
See application file for complete search history.

(56) References Cited

U.S. PATENT DOCUMENTS

| 1,307,088 A | 6/1919 | Drummond |
| 1,451,384 A | 4/1923 | Whyte |

(Continued)

FOREIGN PATENT DOCUMENTS

| CA | 2307927 | 11/2001 |
| DE | 3443022 A1 | 5/1986 |

(Continued)

OTHER PUBLICATIONS

U.S. Appl. No. 12/961,461, filed Dec. 6, 2010 and titled Integrated Fuel Injectors and Igniters Configured to Inject Multiple Fuels and/or Coolants and Associated Methods of Use and Manufacture.

(Continued)

*Primary Examiner* — Hieu T Vo
*Assistant Examiner* — Sherman Manley
(74) *Attorney, Agent, or Firm* — Perkins Coie LLP

(57) ABSTRACT

A vehicular fuel system with onboard fuel characterization including an onboard combustion modifier source capable of supplying a combustion modifier agent, such as hydrogen, and a fuel tank capable of storing a fuel. An injector-igniter is operative to direct inject the fuel and a proportionate amount of the modifier agent into a cylinder of an internal combustion engine. An engine control unit is operatively connectable to the combustion modifier source and the injector. The system may further comprise a mixing valve operative to proportionately mix the fuel and modifier agent. The combustion modifier source may be a tank containing hydrogen or a thermo-chemical reactor, for example.

15 Claims, 6 Drawing Sheets

(51) Int. Cl.
*F02M 21/06* (2006.01)
*F02D 41/00* (2006.01)

(56) References Cited

U.S. PATENT DOCUMENTS

| | | | |
|---|---|---|---|
| 1,765,237 A | 6/1930 | King | |
| 2,255,203 A | 9/1941 | Wiegand | |
| 2,681,212 A * | 6/1954 | Fenley | 261/18.2 |
| 2,744,507 A | 5/1956 | Huber | |
| 2,864,974 A | 12/1958 | Beye | |
| 3,058,453 A | 10/1962 | May | |
| 3,060,912 A | 10/1962 | May | |
| 3,081,758 A | 3/1963 | May | |
| 3,243,335 A | 3/1966 | Faile | |
| 3,373,724 A | 3/1968 | Papst | |
| 3,520,961 A | 7/1970 | Suda et al. | |
| 3,551,738 A | 12/1970 | Young | |
| 3,594,877 A | 7/1971 | Suda et al. | |
| 3,608,050 A | 9/1971 | Carman et al. | |
| 3,689,293 A | 9/1972 | Beall | |
| 3,866,074 A | 2/1975 | Smith | |
| 3,926,169 A | 12/1975 | Leshner et al. | |
| 3,931,438 A | 1/1976 | Beall et al. | |
| 3,960,995 A | 6/1976 | Kourkene | |
| 3,976,039 A | 8/1976 | Henault | |
| 3,997,352 A | 12/1976 | Beall | |
| 4,004,554 A | 1/1977 | Kosaka | |
| 4,066,046 A | 1/1978 | McAlister | |
| 4,087,719 A | 5/1978 | Pratt, Jr. | |
| 4,095,580 A | 6/1978 | Murray et al. | |
| 4,122,816 A | 10/1978 | Fitzgerald et al. | |
| 4,135,481 A | 1/1979 | Resler, Jr. | |
| RE29,978 E | 5/1979 | Leshner et al. | |
| 4,203,393 A | 5/1980 | Giardini | |
| 4,330,732 A | 5/1982 | Lowther | |
| 4,332,223 A | 6/1982 | Dalton | |
| 4,364,342 A | 12/1982 | Asik | |
| 4,377,455 A | 3/1983 | Kadija et al. | |
| 4,381,740 A | 5/1983 | Crocker | |
| 4,382,189 A | 5/1983 | Wilson | |
| 4,448,160 A | 5/1984 | Vosper | |
| 4,469,160 A | 9/1984 | Giamei | |
| 4,483,485 A | 11/1984 | Kamiya et al. | |
| 4,511,612 A | 4/1985 | Huther et al. | |
| 4,528,270 A | 7/1985 | Matsunaga | |
| 4,536,452 A | 8/1985 | Stempin et al. | |
| 4,567,857 A | 2/1986 | Houseman et al. | |
| 4,574,037 A | 3/1986 | Samejima et al. | |
| 4,677,960 A | 7/1987 | Ward | |
| 4,688,538 A | 8/1987 | Ward et al. | |
| 4,733,646 A | 3/1988 | Iwasaki | |
| 4,736,718 A | 4/1988 | Linder | |
| 4,742,265 A | 5/1988 | Giachino et al. | |
| 4,760,818 A | 8/1988 | Brooks et al. | |
| 4,760,820 A | 8/1988 | Tozzi | |
| 4,774,914 A | 10/1988 | Ward | |
| 4,774,919 A | 10/1988 | Matsuo et al. | |
| 4,834,033 A | 5/1989 | Larsen | |
| 4,841,925 A | 6/1989 | Ward | |
| 4,922,883 A | 5/1990 | Iwasaki | |
| 4,932,263 A | 6/1990 | Wlodarczyk | |
| 4,967,708 A | 11/1990 | Linder et al. | |
| 4,977,873 A | 12/1990 | Cherry et al. | |
| 4,982,708 A | 1/1991 | Stutzenberger | |
| 5,034,852 A | 7/1991 | Rosenberg | |
| 5,055,435 A | 10/1991 | Hamanaka et al. | |
| 5,056,496 A | 10/1991 | Morino et al. | |
| 5,072,617 A | 12/1991 | Weiss | |
| 5,076,223 A | 12/1991 | Harden et al. | |
| 5,095,742 A | 3/1992 | James et al. | |
| 5,109,817 A | 5/1992 | Cherry | |
| 5,131,376 A | 7/1992 | Ward et al. | |
| 5,193,515 A | 3/1993 | Oota et al. | |
| 5,207,208 A | 5/1993 | Ward | |
| 5,211,142 A | 5/1993 | Matthews et al. | |
| 5,220,901 A | 6/1993 | Morita et al. | |
| 5,267,601 A | 12/1993 | Dwivedi | |
| 5,297,518 A | 3/1994 | Cherry | |
| 5,305,360 A | 4/1994 | Remark et al. | |
| 5,328,094 A | 7/1994 | Goetzke et al. | |
| 5,377,633 A * | 1/1995 | Wakeman | 123/297 |
| 5,390,546 A | 2/1995 | Wlodarczyk | |
| 5,392,745 A | 2/1995 | Beck | |
| 5,394,838 A | 3/1995 | Chandler | |
| 5,421,195 A | 6/1995 | Wlodarczyk | |
| 5,421,299 A | 6/1995 | Cherry | |
| 5,435,286 A | 7/1995 | Carroll, III et al. | |
| 5,439,532 A | 8/1995 | Fraas | |
| 5,456,241 A | 10/1995 | Ward | |
| 5,475,772 A | 12/1995 | Hung et al. | |
| 5,497,744 A | 3/1996 | Nagaosa et al. | |
| 5,517,961 A | 5/1996 | Ward | |
| 5,531,199 A | 7/1996 | Bryant et al. | |
| 5,549,746 A | 8/1996 | Scott et al. | |
| 5,584,490 A | 12/1996 | Inoue et al. | |
| 5,588,299 A | 12/1996 | DeFreitas | |
| 5,605,125 A | 2/1997 | Yaoita | |
| 5,607,106 A | 3/1997 | Bentz et al. | |
| 5,662,389 A | 9/1997 | Truglio et al. | |
| 5,676,026 A | 10/1997 | Tsuboi et al. | |
| 5,694,761 A | 12/1997 | Griffin, Jr. | |
| 5,699,253 A | 12/1997 | Puskorius et al. | |
| 5,702,761 A | 12/1997 | DiChiara, Jr. et al. | |
| 5,704,321 A | 1/1998 | Suckewer et al. | |
| 5,715,788 A | 2/1998 | Tarr et al. | |
| 5,738,283 A | 4/1998 | Potz et al. | |
| 5,738,818 A | 4/1998 | Atmur et al. | |
| 5,746,171 A | 5/1998 | Yaoita | |
| 5,767,026 A | 6/1998 | Kondoh et al. | |
| 5,797,427 A | 8/1998 | Buescher | |
| 5,806,581 A | 9/1998 | Haasch et al. | |
| 5,853,175 A | 12/1998 | Udagawa | |
| 5,863,326 A | 1/1999 | Nause et al. | |
| 5,876,659 A | 3/1999 | Yasutomi et al. | |
| 5,915,272 A | 6/1999 | Foley et al. | |
| 5,941,207 A | 8/1999 | Anderson et al. | |
| 5,975,032 A | 11/1999 | Iwata | |
| 5,975,433 A | 11/1999 | Hasegawa et al. | |
| 5,983,855 A | 11/1999 | Benedikt et al. | |
| 6,017,390 A | 1/2000 | Charych et al. | |
| 6,026,568 A | 2/2000 | Atmur et al. | |
| 6,029,627 A | 2/2000 | VanDyne | |
| 6,062,498 A | 5/2000 | Klopfer | |
| 6,065,692 A | 5/2000 | Brinn, Jr. | |
| 6,081,183 A | 6/2000 | Mading et al. | |
| 6,085,990 A | 7/2000 | Augustin | |
| 6,092,501 A | 7/2000 | Matayoshi et al. | |
| 6,092,507 A | 7/2000 | Bauer et al. | |
| 6,093,338 A | 7/2000 | Tani et al. | |
| 6,102,303 A | 8/2000 | Bright et al. | |
| 6,131,607 A | 10/2000 | Cooke | |
| 6,138,639 A | 10/2000 | Hiraya et al. | |
| 6,155,212 A | 12/2000 | McAlister | |
| 6,173,913 B1 | 1/2001 | Shafer et al. | |
| 6,185,355 B1 | 2/2001 | Hung | |
| 6,186,419 B1 | 2/2001 | Kampmann et al. | |
| 6,189,522 B1 | 2/2001 | Moriya | |
| 6,253,728 B1 | 7/2001 | Matayoshi et al. | |
| 6,267,307 B1 | 7/2001 | Pontoppidan | |
| 6,335,065 B1 | 1/2002 | Steinlage et al. | |
| 6,338,445 B1 | 1/2002 | Lambert et al. | |
| 6,360,721 B1 | 3/2002 | Schuricht et al. | |
| 6,378,485 B2 | 4/2002 | Elliott | |
| 6,386,178 B1 | 5/2002 | Rauch | |
| 6,446,597 B1 | 9/2002 | McAlister | |
| 6,453,660 B1 | 9/2002 | Johnson et al. | |
| 6,455,173 B1 | 9/2002 | Marijnissen et al. | |
| 6,478,007 B2 | 11/2002 | Miyashita et al. | |
| 6,485,852 B1 | 11/2002 | Miller et al. | |
| 6,506,336 B1 | 1/2003 | Beall et al. | |
| 6,517,011 B1 | 2/2003 | Ayanji et al. | |
| 6,532,315 B1 | 3/2003 | Hung et al. | |
| 6,536,405 B1 | 3/2003 | Rieger et al. | |
| 6,567,599 B2 | 5/2003 | Hung | |

(56) References Cited

U.S. PATENT DOCUMENTS

| | | | |
|---|---|---|---|
| 6,568,362 B2 | 5/2003 | Whealton et al. | |
| 6,578,775 B2 | 6/2003 | Hokao | |
| 6,583,901 B1 | 6/2003 | Hung | |
| 6,584,244 B2 | 6/2003 | Hung | |
| 6,587,239 B1 | 7/2003 | Hung | |
| 6,615,899 B1 | 9/2003 | Woodward et al. | |
| 6,647,948 B2 | 11/2003 | Kyuuma et al. | |
| 6,663,027 B2 | 12/2003 | Jameson et al. | |
| 6,672,277 B2 | 1/2004 | Yasuoka et al. | |
| 6,687,597 B2* | 2/2004 | Sulatisky et al. | 701/104 |
| 6,700,306 B2 | 3/2004 | Nakamura et al. | |
| 6,705,274 B2 | 3/2004 | Kubo | |
| 6,712,035 B2* | 3/2004 | Gottemoller et al. | 123/297 |
| 6,722,340 B1 | 4/2004 | Sukegawa et al. | |
| 6,725,826 B2 | 4/2004 | Esteghlal | |
| 6,745,744 B2 | 6/2004 | Suckewer et al. | |
| 6,748,918 B2 | 6/2004 | Rieger et al. | |
| 6,749,043 B2 | 6/2004 | Brown et al. | |
| 6,763,811 B1 | 7/2004 | Tamol, Sr. | |
| 6,776,358 B2 | 8/2004 | Arimoto | |
| 6,796,516 B2 | 9/2004 | Maier et al. | |
| 6,814,313 B2 | 11/2004 | Petrone et al. | |
| 6,832,588 B2 | 12/2004 | Herden et al. | |
| 6,845,608 B2* | 1/2005 | Klenk et al. | 60/274 |
| 6,845,920 B2 | 1/2005 | Sato et al. | |
| 6,850,069 B2 | 2/2005 | McQueeney et al. | |
| 6,851,413 B1 | 2/2005 | Tamol, Sr. | |
| 6,871,630 B2 | 3/2005 | Herden et al. | |
| 6,881,386 B2 | 4/2005 | Rabinovich et al. | |
| 6,883,490 B2 | 4/2005 | Jayne | |
| 6,899,076 B2 | 5/2005 | Funaki et al. | |
| 6,904,893 B2 | 6/2005 | Hotta et al. | |
| 6,912,998 B1 | 7/2005 | Rauznitz et al. | |
| 6,925,983 B2 | 8/2005 | Herden et al. | |
| 6,940,213 B1 | 9/2005 | Heinz et al. | |
| 6,959,693 B2 | 11/2005 | Oda | |
| 6,976,683 B2 | 12/2005 | Eckert et al. | |
| 6,994,073 B2 | 2/2006 | Tozzi et al. | |
| 7,007,658 B1 | 3/2006 | Cherry et al. | |
| 7,013,863 B2 | 3/2006 | Shiraishi et al. | |
| 7,025,358 B2 | 4/2006 | Ueta et al. | |
| 7,032,845 B2 | 4/2006 | Dantes et al. | |
| 7,070,126 B2 | 7/2006 | Shinogle | |
| 7,073,480 B2 | 7/2006 | Shiraishi et al. | |
| 7,086,376 B2 | 8/2006 | McKay | |
| 7,104,246 B1 | 9/2006 | Gagliano et al. | |
| 7,104,250 B1 | 9/2006 | Yi et al. | |
| 7,121,253 B2 | 10/2006 | Shiraishi et al. | |
| 7,131,426 B2 | 11/2006 | Ichinose et al. | |
| 7,140,347 B2 | 11/2006 | Suzuki et al. | |
| 7,201,136 B2 | 4/2007 | McKay et al. | |
| 7,249,578 B2 | 7/2007 | Fricke et al. | |
| 7,255,290 B2 | 8/2007 | Bright et al. | |
| 7,275,374 B2* | 10/2007 | Stewart et al. | 60/601 |
| 7,278,392 B2 | 10/2007 | Zillmer et al. | |
| 7,278,396 B2* | 10/2007 | Leone et al. | 123/431 |
| 7,287,492 B2* | 10/2007 | Leone et al. | 123/1 A |
| 7,293,552 B2* | 11/2007 | Leone et al. | 123/520 |
| 7,302,933 B2* | 12/2007 | Kerns | 123/431 |
| 7,309,029 B2 | 12/2007 | Boecking | |
| 7,357,101 B2* | 4/2008 | Boyarski | 123/1 A |
| 7,406,947 B2* | 8/2008 | Lewis et al. | 123/478 |
| 7,409,929 B2 | 8/2008 | Miyahara et al. | |
| 7,412,966 B2* | 8/2008 | Lewis et al. | 123/431 |
| 7,418,940 B1 | 9/2008 | Yi et al. | |
| 7,449,034 B1 | 11/2008 | Mikkelsen et al. | |
| 7,481,043 B2 | 1/2009 | Hirata et al. | |
| 7,513,222 B2 | 4/2009 | Orlosky | |
| 7,554,250 B2 | 6/2009 | Kadotani et al. | |
| 7,625,531 B1 | 12/2009 | Coates et al. | |
| 7,626,315 B2 | 12/2009 | Nagase | |
| 7,650,873 B2 | 1/2010 | Hofbauer et al. | |
| 7,703,775 B2 | 4/2010 | Matsushita et al. | |
| 7,707,832 B2 | 5/2010 | Commaret et al. | |
| 7,714,483 B2 | 5/2010 | Hess et al. | |
| 7,728,489 B2 | 6/2010 | Heinz et al. | |
| 7,775,188 B2 | 8/2010 | Ehrlich | |
| 7,849,833 B2 | 12/2010 | Toyoda | |
| 7,861,696 B2 | 1/2011 | Lund | |
| 7,918,212 B2 | 4/2011 | Verdejo et al. | |
| 8,069,836 B2 | 12/2011 | Ehresman | |
| 8,147,599 B2 | 4/2012 | McAlister | |
| 8,312,759 B2 | 11/2012 | McAlister | |
| 8,318,131 B2 | 11/2012 | McAlister | |
| 8,387,599 B2 | 3/2013 | McAlister | |
| 8,414,288 B2 | 4/2013 | Tzriker | |
| 8,441,361 B2 | 5/2013 | McAlister | |
| 8,555,860 B2 | 10/2013 | McAlister | |
| 8,561,598 B2 | 10/2013 | McAlister | |
| 8,601,819 B2 | 12/2013 | Hammer et al. | |
| 8,646,432 B1 | 2/2014 | McAlister et al. | |
| 8,747,496 B2 | 6/2014 | Neels et al. | |
| 8,800,527 B2 | 8/2014 | McAlister | |
| 8,820,293 B1 | 9/2014 | McAlister | |
| 8,950,182 B2 | 2/2015 | Roth | |
| 9,188,086 B2 | 11/2015 | McAlister | |
| 9,200,561 B2 | 12/2015 | McAlister | |
| 9,279,398 B2 | 3/2016 | McAlister | |
| 9,341,152 B2 | 5/2016 | McAlister | |
| 2002/0017271 A1 | 2/2002 | Suckewer et al. | |
| 2002/0017573 A1 | 2/2002 | Sturman | |
| 2002/0084793 A1 | 7/2002 | Hung et al. | |
| 2002/0131171 A1 | 9/2002 | Hung | |
| 2002/0131666 A1 | 9/2002 | Hung et al. | |
| 2002/0131673 A1 | 9/2002 | Hung | |
| 2002/0131674 A1 | 9/2002 | Hung | |
| 2002/0131706 A1 | 9/2002 | Hung | |
| 2002/0131756 A1 | 9/2002 | Hung | |
| 2002/0141692 A1 | 10/2002 | Hung | |
| 2002/0150375 A1 | 10/2002 | Hung et al. | |
| 2002/0151113 A1 | 10/2002 | Hung et al. | |
| 2003/0012985 A1* | 1/2003 | McAlister | 429/12 |
| 2004/0008989 A1 | 1/2004 | Hung | |
| 2004/0061006 A1 | 4/2004 | Petrone et al. | |
| 2004/0256495 A1* | 12/2004 | Baker et al. | 239/533.2 |
| 2005/0045146 A1* | 3/2005 | McKay et al. | 123/297 |
| 2005/0056247 A1 | 3/2005 | Durling | |
| 2005/0224043 A1 | 10/2005 | Vogel et al. | |
| 2005/0255011 A1 | 11/2005 | Greathouse et al. | |
| 2006/0005738 A1 | 1/2006 | Kumar | |
| 2006/0005739 A1 | 1/2006 | Kumar | |
| 2006/0037563 A1 | 2/2006 | Raab et al. | |
| 2006/0071094 A1 | 4/2006 | Ehresman | |
| 2006/0278195 A1 | 12/2006 | Hotta et al. | |
| 2007/0108317 A1 | 5/2007 | Boecking | |
| 2007/0189114 A1 | 8/2007 | Reiner et al. | |
| 2007/0215071 A1 | 9/2007 | Dearth et al. | |
| 2008/0098924 A1* | 5/2008 | Sakamaki | 123/297 |
| 2008/0223344 A1 | 9/2008 | Suzuki et al. | |
| 2008/0245318 A1 | 10/2008 | Kuroki et al. | |
| 2009/0014554 A1 | 1/2009 | Malek et al. | |
| 2009/0093951 A1 | 4/2009 | McKay et al. | |
| 2009/0223474 A1 | 9/2009 | Ehrlich | |
| 2009/0230789 A1 | 9/2009 | Markert et al. | |
| 2009/0271090 A1* | 10/2009 | Surnilla et al. | 701/103 |
| 2009/0320789 A1* | 12/2009 | Lund | 123/299 |
| 2010/0077986 A1 | 4/2010 | Chen | |
| 2010/0183993 A1* | 7/2010 | McAlister | 431/254 |
| 2010/0199948 A1* | 8/2010 | Rogak et al. | 123/304 |
| 2010/0269775 A1 | 10/2010 | Chandes et al. | |
| 2011/0036309 A1* | 2/2011 | McAlister | 123/3 |
| 2011/0042476 A1 | 2/2011 | McAlister | |
| 2011/0056458 A1* | 3/2011 | McAlister | 123/297 |
| 2011/0132319 A1* | 6/2011 | McAlister | 123/297 |
| 2011/0146619 A1 | 6/2011 | McAlister | |
| 2011/0220040 A1* | 9/2011 | McAlister | 123/3 |
| 2011/0226988 A1* | 9/2011 | McAlister | 252/182.12 |
| 2011/0233308 A1* | 9/2011 | McAlister | 239/533.2 |
| 2011/0239973 A1 | 10/2011 | Qin | |
| 2011/0253104 A1* | 10/2011 | McAlister | 123/445 |
| 2011/0297753 A1* | 12/2011 | McAlister et al. | 239/5 |
| 2012/0060497 A1 | 3/2012 | Roth | |
| 2013/0043323 A1 | 2/2013 | McAlister | |
| 2013/0149621 A1 | 6/2013 | McAlister | |

(56) References Cited

U.S. PATENT DOCUMENTS

| | | | |
|---|---|---|---|
| 2013/0213256 A1* | 8/2013 | McAlister | 105/62.1 |
| 2014/0041631 A1 | 2/2014 | McAlister | |
| 2014/0102407 A1 | 4/2014 | McAlister | |
| 2014/0130756 A1 | 5/2014 | McAlister | |
| 2014/0271449 A1* | 9/2014 | McAlister | 423/658 |
| 2015/0013650 A1 | 1/2015 | McAlister | |
| 2015/0075486 A1 | 3/2015 | McAlister | |
| 2015/0152825 A1 | 6/2015 | McAlister | |
| 2015/0252757 A1 | 9/2015 | McAlister | |

FOREIGN PATENT DOCUMENTS

| | | |
|---|---|---|
| EP | 392594 A2 | 10/1990 |
| EP | 0661446 | 7/1995 |
| EP | 1745201 | 12/2009 |
| GB | 1038490 A | 8/1966 |
| JP | 61-023862 A | 2/1986 |
| JP | 2008208759 | 9/2008 |
| JP | 2009-287549 A | 12/2009 |
| WO | WO9527845 | 10/1995 |
| WO | WO0165107 | 9/2001 |
| WO | WO2009064712 | 5/2009 |
| WO | WO2011071607 | 6/2011 |

OTHER PUBLICATIONS

U.S. Appl. No. 13/864,192, filed Apr. 16, 2013 and titled Integrated Fuel Injector Igniters Configured to Inject Multiple Fuels and/or Coolants and Associated Methods of Use and Manufacture.

U.S. Appl. No. 12/841,170, filed Mar. 21, 2010, and titled Integrated Fuel Injectors and Igniters and Associated Methods of Use and Manufacture.

U.S. Appl. No. 13/843,976, filed Mar. 15, 2013 and titled Chemical Fuel Conditioning and Activation.

U.S. Appl. No. 13/797,753, filed Mar. 12, 2013 and titled Method and Apparatus for Providing Adaptive Swirl Injection and Ignition.

International Search Report and Written Opinion mailed Jul. 8, 2014 for PCT/US2014/026501, 14 pages.

European Search Report mailed Nov. 13, 2015 for European Patent Application No. 10814045.0, 8 pages.

European Search Report mailed Jul. 1, 2016 for European Patent Application No. 13854103.2, 10 pages.

International Search Report and Written Opinion mailed Oct. 10, 2014 for PCT/US2014/029154, 17 pages.

U.S. Appl. No. 13/844,240, filed Mar. 15, 2013, McAlister.

U.S. Appl. No. 13/844,488, filed Mar. 15, 2013, McAlister.

International Search Report and Written Opinion for Application No. PCT/US2010/002076; Applicant: McAlister Technologies, LLC.; Date of Mailing: Apr. 29, 2011 (8 pages).

International Search Report and Written Opinion for Application No. PCT/US2010/059147; Applicant: McAlister Technologies, LLC.; Date of Mailing: Aug. 31, 2011, 11 pages.

"Ford DIS/EDIS "Waste Spark" Ignition System." Accessed: Jul. 15, 2010. Printed: Jun. 8, 2011. <http://rockledge.home.comcast.net/~rockledge/RangerPictureGallery/DIS_EDIS.htm>. pp. 1-6.

"P dV's Custom Data Acquisition Systems Capabilities." PdV Consulting. Accessed: Jun. 28, 2010. Printed: May 16, 2011. <http://www.pdvconsult.com/capabilities%20-%20daqsys.html>. pp. 1-10.

"Piston motion equations." Wikipedia, the Free Encyclopedia. Published: Jul. 4, 2010. Accessed: Aug. 7, 2010. Printed: Aug. 7, 2010. <http://en.wikipedia.org/wiki/Dopant>. pp. 1-9.

"Piston Velocity and Acceleration." EPI, Inc. Accessed: Jun. 28, 2010. Printed: May 16, 2011. <http://www.epi-eng.com/piston_engine_technology/piston_velocity_and_acceleration.htm>. pp. 1-3.

"SmartPlugs—Aviation." SmartPlugs.com. Published: Sep. 2000. Accessed: May 31, 2011. <http://www.smartplugs.com/news/aeronews0900.htm>. pp. 1-3.

Birchenough, Arthur G. "A Sustained-arc Ignition System for Internal Combustion Engines." Nasa Technical Memorandum (NASA TM-73833). Lewis Research Center. Nov. 1977. pp. 1-15.

Doggett, William. "Measuring Internal Combustion Engine In-Cylinder Pressure with LabVIEW." National Instruments. Accessed: Jun. 28, 2010. Printed: May 16, 2011. <http://sine.ni.com/cs/app/doc/p/id/cs-217>. pp. 1-2.

Erjavec, Jack. "Automotive Technology: a Systems Approach, vol. 2." Thomson Delmar Learning. Clifton Park, NY. 2005. p. 845.

Hollembeak, Barry. "Automotive Fuels & Emissions." Thomson Delmar Learning. Clifton Park, NY. 2005. p. 298.

Lewis Research Center. "Fabry-Perot Fiber-Optic Temperature Sensor." NASA Tech Briefs. Published: Jan. 1, 2009. Accessed: May 16, 2011. <http://www.techbriefs.com/content/view/2114/32/>.

Riza et al. "All-Silicon Carbide Hybrid Wireless-Wired Optics Temperature Sensor Network Basic Design Engineering for Power Plant Gas Turbines." International Journal of Optomechatronics, vol. 4, Issue 1. Jan. 2010. pp. 1-9.

Riza et al. "Hybrid Wireless-Wired Optical Sensor for Extreme Temperature Measurement in Next Generation Energy Efficient Gas Turbines." Journal of Engineering for Gas Turbines and Power, vol. 132, Issue 5. May 2010. pp. 051601-1-51601-11.

* cited by examiner

# INJECTOR-IGNITER WITH FUEL CHARACTERIZATION

BACKGROUND

Long standing and difficult problems with alternative fuels such as natural gas and various landfill fuels and mixtures that may be derived from anaerobic processes such as thermal dissociation, endothermic reformation, and/or digestion of sewage, garbage, farm wastes, and forest slash include: chemical and physical property variability, fuel heating value variability, condensates such as water including acid, and other contaminates.

Modern engines and fuel systems are designed to operate with specific fuel characteristics. The variability in the above described, less than optimum sources of fuel have compromised or defeated various past attempts to provide satisfactory power, operational control, drivability, fuel economy, and emissions in instances that alternative fuels have been substituted for gasoline or diesel fuel in internal combustion engines. Even in instances in which elaborate compensations are made to overcome these problems for a specific fuel, when the properties of that fuel vary or if it is desired to switch to another fuel, the fuel system is generally unable to compensate for such large changes in fuel properties.

Accordingly, there is a need for fuel systems and methods for operating internal combustion engines on various, less than optimal fuels while maintaining satisfactory power, operational control, drivability, fuel economy, and emissions standards.

BRIEF DESCRIPTION OF THE DRAWINGS

Non-limiting and non-exhaustive embodiments of the devices, systems, and methods, including the preferred embodiment, are described with reference to the following figures, wherein like reference numerals refer to like parts throughout the various views unless otherwise specified.

DETAILED DESCRIPTION

Figure 1:
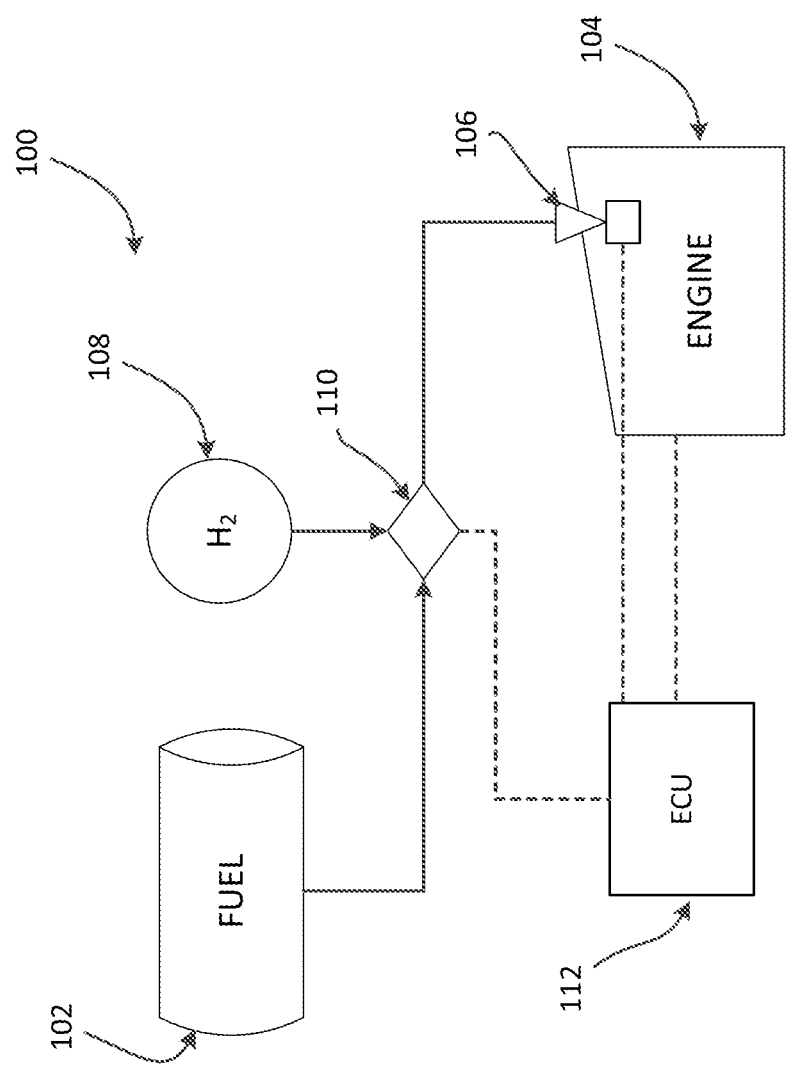
FIG. 1 is a schematic representation of a fuel injection system including fuel characterization according to a representative embodiment.

The representative embodiments disclosed herein include fuel systems and methods that include fuel characterization. Characterizing less than optimum fuels with the addition of a combustion modifier agent, such as hydrogen, allows an engine and fuel system, which are designed to operate with a specific type of fuel, to adapt to other types and grades of fuel. Thus, the disclosed technology allows an engine to operate cleanly and efficiently on plentiful, very low cost, but otherwise poor quality fuel. In addition, the disclosed technology allows an engine to operate on multiple different fuel selections with wide variation in properties. Specific details of several embodiments of the technology are described below with reference to FIGS. 1-5. Other details describing well-known structures and systems often associated with ignition systems, fuel systems, and electronic valve actuation, such as fuel pumps, regulators, and the like, have not been set forth in the following disclosure to avoid unnecessarily obscuring the description of the various embodiments of the technology. Many of the details, dimensions, angles, steps, and other features shown in the figures are merely illustrative of particular embodiments of the technology. Accordingly, other embodiments can have other details, dimensions, angles, steps, and features without departing from the spirit or scope of the present technology. A person of ordinary skill in the art, therefore, will accordingly understand that the technology may have other embodiments with additional elements, or the technology may have other embodiments without several of the features shown and described below with reference to FIGS. 1-5.

Some aspects of the technology described below may take the form of or make use of computer-executable instructions, including routines executed by a programmable computer or controller. Those skilled in the relevant art will appreciate that aspects of the technology can be practiced on computer systems other than those described herein. Aspects of the technology can be embodied in a special-purpose computer or data processor, such as an engine control unit (ECU), engine control module (ECM), fuel system controller, ignition controller, or the like, that is specifically programmed, configured, or constructed to perform one or more computer-executable instructions consistent with the technology described below. Accordingly, the term "computer," "processor," or "controller," as may be used herein, refers to any data processor and can include ECUs, ECMs, and modules, as well as Internet appliances and hand-held devices (including diagnostic devices, palm-top computers, wearable computers, cellular or mobile phones, multi-processor systems, processor-based or programmable consumer electronics, network computers, mini computers, and the like). Information handled by these computers can be presented on any suitable display medium, including a CRT display, LCD, or dedicated display device or mechanism (e.g., a gauge).

The technology can also be practiced in distributed environments, where tasks or modules are performed by remote processing devices that are linked through a communications network. In a distributed computing environment, program modules or subroutines may be located in local and remote memory storage devices. Aspects of the technology described below may be stored or distributed on computer-readable media, including magnetic or optically readable or removable computer disks, as well as distributed electronically over networks. Such networks may include, for example and without limitation, Controller Area Networks (CAN), Local Interconnect Networks (LIN), and the like. In particular embodiments, data structures and transmissions of data particular to aspects of the technology are also encompassed within the scope of the technology.

FIG. 1 illustrates a fuel system 100 with fuel characterization capabilities according to a representative embodiment. System 100 includes a fuel tank 102 which supplies fuel to engine 104 via injector 106. As fuel is supplied to injector 106 the fuel is characterized (e.g., mixed) with a combustion modifier agent, such as hydrogen from combustion modifier source 108. In this embodiment, the hydrogen source is a pressurized tank of hydrogen. However, other suitable hydrogen sources may include, for example and without limitation, a thermo-chemical reactor (TCR) or a hydrogen reactor, examples of which are described more fully below. These and other combustion modifier sources may be supplied to a stationary engine or vehicle mounted for onboard, on-demand production of combustion modifier agents, such as hydrogen.

A mixing valve 110 combines the fuel and hydrogen in the appropriate proportions based on the type of fuel. For example and without limitation, in the case of natural gas, about one to 99 percent (five to ten percent being commonly adjusted concentrations) hydrogen may be added to the fuel at mixing valve 110 prior to being injected into engine 104 by injector 106. In this embodiment, ECU 112 controls the engine 104, injector 106, and mixing valve 110. The ECU adaptively determines the proportion of combustion modifier to add to the fuel based on the chemical and physical properties, fuel heating value, and contaminants contained in the fuel. As known in the art, the ECU also accounts for engine operating parameters such as load, emissions (e.g., oxygen sensor input), speed, throttle position, and ambient conditions, for example. The addition of combustion modifier in the appropriate proportion improves the combustion properties of the fuel. In other words, the fuel is characterized for improved combustion and engine performance. Therefore, the disclosed technology allows an engine to run on poor quality fuel by characterizing the fuel with combustion modifiers. Furthermore, the disclosed technology facilitates switching fuels (e.g., from diesel to natural gas) without modification to the engine or fuel system.

Although the fuel and combustion modifier agent are described above as gaseous components, liquid components and combinations of liquid and gaseous components may also be used according to the disclosed technology. Furthermore, other fuels may be used, such as gasoline, diesel, various landfill fuels and mixtures that may be derived from anaerobic processes such as thermal dissociation, endothermic reformation, and/or digestion of sewage, garbage, farm wastes, and forest slash. Moreover, other suitable combustion modifier agents may be used.

Figure 2:
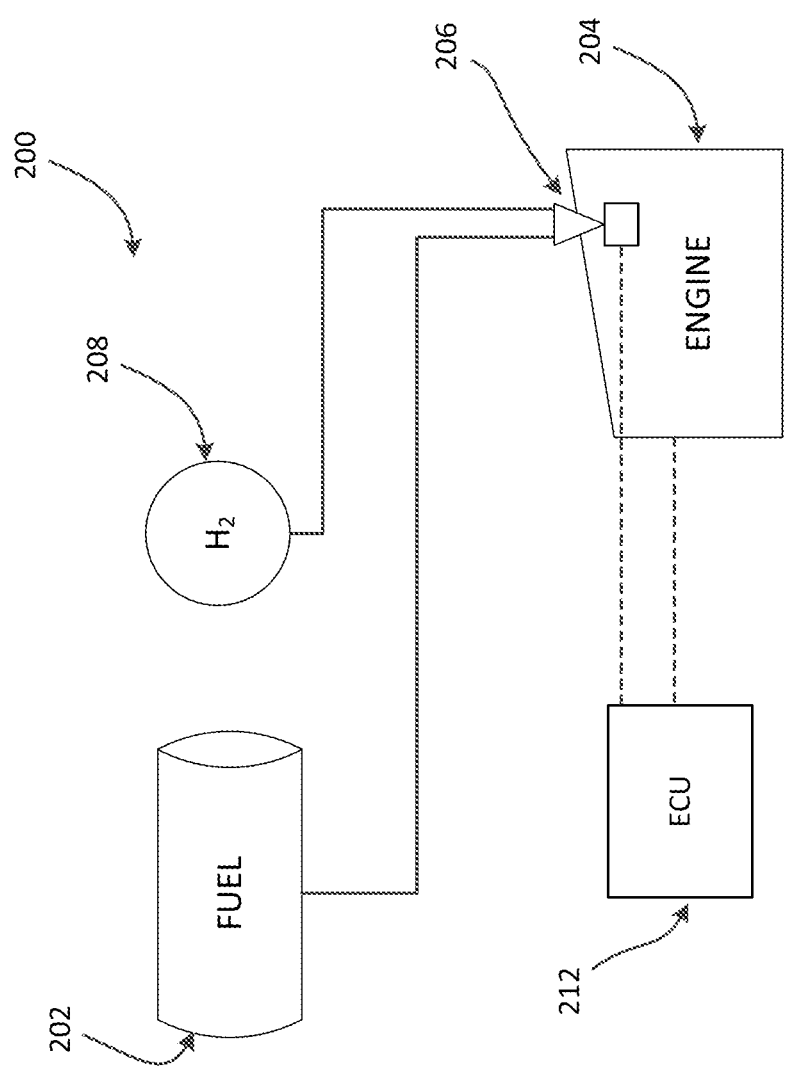
FIG. 2 is a schematic representation of a fuel injection system including fuel characterization according to another representative embodiment.

FIG. 2 illustrates a fuel system 200 with fuel characterization capabilities according to another representative embodiment. System 200 includes a fuel tank 202 that supplies fuel to an engine 204 via injector 206. In this embodiment, the combustion modifier from source 208 is supplied directly to the engine 204 through injector 206. Thus, injector 206 has the ability to inject one or more fuel selections and the combustion modifier without a separate mixing valve and can do so in synchronous or according to other timing arrangements of injections for each fuel selection and the combustion modifier. ECU 212 controls engine 204 along with injector 206 to inject the appropriate proportions of one or more fuel selections and combustion modifier. In some embodiments, injector 206 is an injector-igniter, which has the capability to inject the fuel and combustion modifier agent and to provide an ignition source for combustion. The injector may also be capable of direct injection, whereby fuel and modifier agents are injected directly into the combustion chambers of engine 204 including combustion chambers for two and four-stroke piston, rotary, and gas turbine engine designs.

Figure 3:
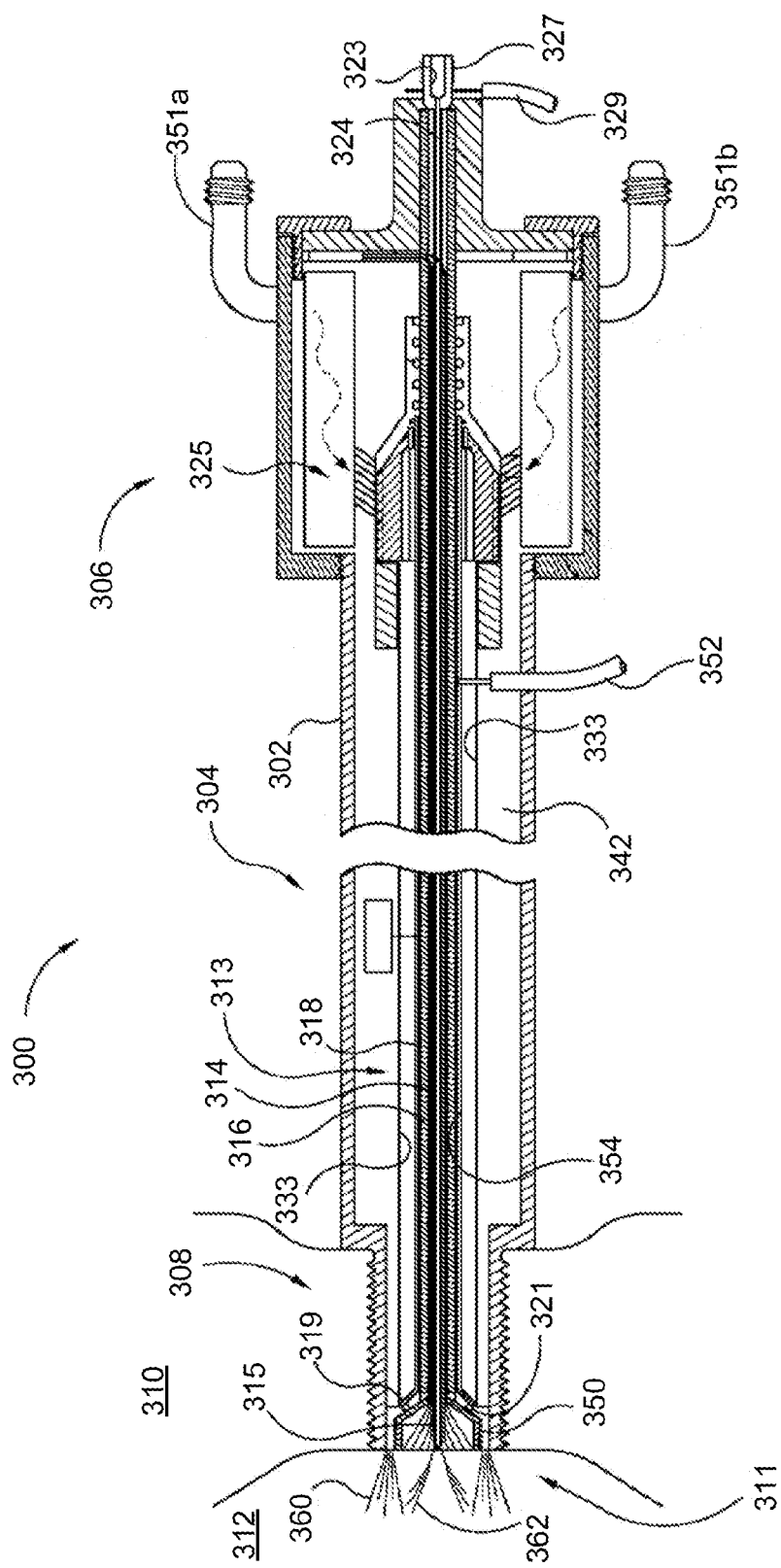
FIG. 3 is a cross-sectional side view of a representative injector-igniter, suitable for implementing the disclosed technology.

FIG. 3 provides an example of an injector-igniter 300 that is particularly suited to provide both a fuel and a combustion modifier to an engine according to the above described systems 100, 200. In addition, injector-igniter 300 includes ignition features capable of initiating ionization, which may then be rapidly propagated as a much larger population of ions as may be adaptively controlled by the time and position magnitude profile of applied voltage in plasma that develops and thrusts outwardly (e.g., Lorentz thrusting) from the injector-igniter 300. Other injector-igniters suitable for use with the disclosed technology are described in U.S. patent application Ser. No. 12/961,461, entitled INTEGRATED FUEL INJECTOR IGNITERS CONFIGURED TO INJECT MULTIPLE FUELS AND/OR COOLANTS AND ASSOCIATED METHODS OF USE AND MANUFACTURE, filed Dec. 6, 2010, the disclosure of which is incorporated herein by reference in its entirety. To the extent the above incorporated application and/or any other materials incorporated herein by reference conflict with the present disclosure, the present disclosure controls.

Injector-igniter 300 includes a body 302 having a middle portion 304 extending between a base portion 306 and a nozzle portion 308. The nozzle portion 308 is configured to at least partially extend through an engine wall or head 310 to inject and ignite fuel and/or combustion modifier agents at or near an interface 311 and/or within a combustion chamber 312. Injector-igniter 300 includes a core assembly 313 extending from the base portion 306 to the nozzle portion 308. The core assembly 313 includes an ignition conductor 314, an ignition insulator 316, and a valve 318.

The ignition conductor 314 includes an end portion 315 proximate to the interface 311 of combustion chamber 312 that includes one or more ignition features that are configured to generate an ignition event. The ignition conductor 314 also includes a first flow channel 324 extending longitudinally through a central portion of the ignition conductor 314. The ignition conductor 314 is coupled to a first terminal 327 that supplies ignition energy (e.g., voltage), as well as fuel or combustion modifier agents, to channel 324 to produce distribution pattern 362. The ignition conductor 314 therefore dispenses the fuel or combustion modifier into the combustion chamber 312 via the first flow channel 324. The first terminal 327 is also coupled to a first ignition energy source via a first ignition source conductor 329.

Injector 300 also includes a second flow channel 333 extending longitudinally through the body 302 from the inlet passages 351 (identified individually as 351a and 351b) located on base portion 306 to the nozzle portion 308. More specifically, the second flow channel 333 extends coaxially with the stem portion of the valve 318 and is spaced radially apart from the stem portion of the valve 318. A fuel or combustion modifier agent can enter the second flow channel 333 from the base portion 306 of the injector 300 to pass to the combustion chamber 312 via valve 318. The valve 318 includes a first end portion in the base portion 306 that engages an actuator or valve operator assembly 325. The valve 318 also includes a sealing end portion 319 that contacts a valve seal 321. The valve operator assembly 325 actuates the valve 318 relative to the ignition insulator 316 between an open position and a closed position. In the open position, the sealing end portion 319 of the valve 318 is spaced apart from the valve seal 321 to allow the fuel or combustion modifier to flow past the valve seal 321 and out of the nozzle portion 308 to produce distribution pattern 360.

The injector 300 further includes an insulated second terminal 352 at the middle portion 304 or at the base portion 306. The second terminal 352 is electrically coupled to the second ignition feature 350 via a second ignition conductor 354. For example, the second ignition conductor 354 can be a conductive layer or coating disposed on the ignition insulator 316. The second ignition feature 350 is coaxial and radially spaced apart from the end portion 315 of the ignition conductor 314.

In operation, the injector-igniter 300 is configured to inject one, two or more fuels and combustion modifier agents into the combustion chamber 312. The injector 300 is also configured to ignite the fuels and modifier agents as they exit the nozzle portion 308, and/or provide projected ignition within the combustion chamber. For example, a combustion modifier, such as hydrogen, can be introduced into the first flow passage 324 in the ignition conductor 314 via the first inlet passage 323 in the first terminal 327. A fuel, such as natural gas can be introduced into the base portion 306 via the second inlet passages 351$a$ and/or 351$b$. Alternative various other fuels such as ammonia can be introduced through inlet 351$a$ and methanol, carbon monoxide, acetylene, dimethyl ether or diethyl ether can be introduced through 351$b$. The fuel selections can travel from the second inlet passages 351 through the second flow channel 333 extending longitudinally adjacent to the valve 318. The second flow channel 333 extends between an outer surface of the valve 318 and an inner surface of the body insulator 342 of the middle portion 304 and the nozzle portion 308.

The first ignition source conductor 329 can energize or otherwise transmit ignition energy (e.g., voltage) to an ignition feature carried by the ignition conductor 314 at the nozzle portion 308. As such, the ignition conductor 314 can ionize and/or ignite oxidant supplied by operation of the combustion chamber and the fuel at the interface 311 with the combustion chamber 312. The second ignition conductor 354 conveys DC and/or AC voltage to adequately heat and/or ionize and rapidly propagate and thrust the fuel and/or modifier agents toward the combustion chamber. A second terminal 352 can provide the ignition energy to the second ignition feature 350 via the second ignition conductor 354.

In other embodiments, combustion modifiers such as oxygen or nitrous oxide may be introduced into the combustion chamber at selected times such as before, during, or after introduction of fuels and/or other combustion modifiers into the combustion chamber. Illustratively, oxygen can be introduced into a combustion chamber through a selected inlet such as 327 and at the same or other times a fuel selection such as natural gas or naphtha can be introduced through 351$a$ and another combustion modifier such as hydrogen can be introduced through 351$b$.

Figure 4A:
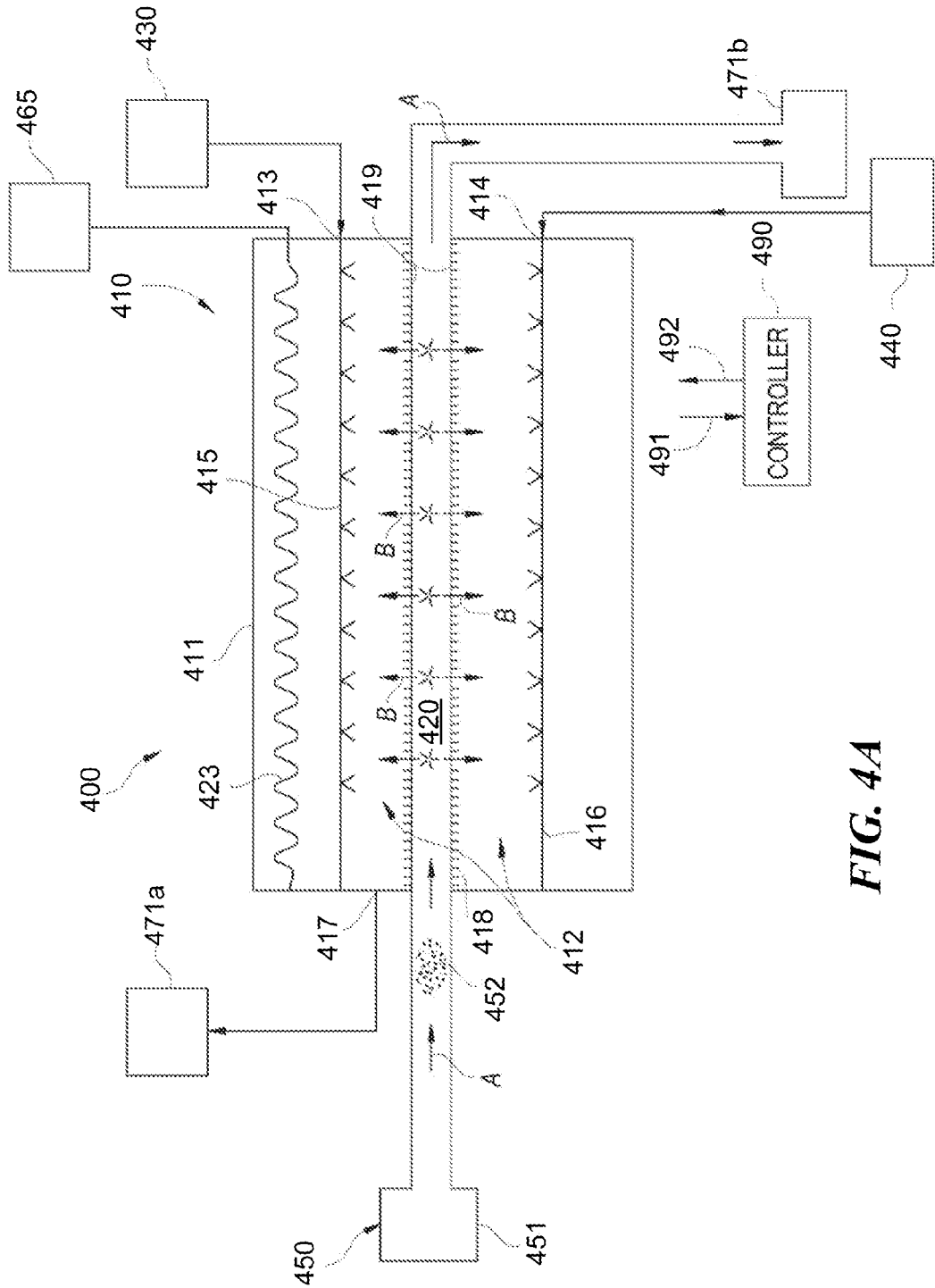
FIG. 4A is a partially schematic, partially cross-sectional illustration of a suitable thermo chemical reactor system for hydrogen generation according to a representative embodiment.

FIG. 4A is a partially schematic illustration of a representative thermochemical regeneration or TCR system 400 that includes a reactor 410. The reactor 410 further includes a reactor vessel 411 that encloses or partially encloses a reaction zone 412. In at least some instances, the reactor vessel 411 has one or more transmissive surfaces positioned to facilitate the chemical reaction taking place within the reaction zone 412. In a representative example, the reactor vessel 411 receives a hydrogen donor provided by a donor source 430 to a donor entry port 413. For example, the hydrogen donor can include methane or another hydrocarbon. A donor distributor or manifold 415 within the reactor vessel 411 disperses or distributes the hydrogen donor into the reaction zone 412. The reactor vessel 411 also receives steam from a steam/water source 440 via a steam entry port 414. A steam distributor 416 in the reactor vessel 411 distributes the steam into the reaction zone 412. The reactor vessel 411 can further include a heater 423 that supplies heat to the reaction zone 412 to facilitate endothermic reactions. Heater 423 is powered by an onboard electrical power source 465. The reactions performed at the reaction zone 412 can include dissociating methane or another hydrocarbon into hydrogen or a hydrogen compound, and carbon or a carbon compound. The products of the reaction (e.g., hydrogen) exit the reactor vessel 411 via an exit port 417 and are collected at a reaction product collector 471$a$ that may in turn be connected to a fuel characterization injection system, such as systems 100 and 200 described above.

The system 400 can further include a source 450 of radiant energy (e.g., waste heat) and/or additional reactants, which provides constituents to a passage 418 within the reactor vessel 411. For example, the heat/reactant source 450 can include a combustion chamber 451 that provides hot combustion/exhaust products 452 to the passage 418, as indicated by arrows A. A combustion products collector 471$b$ collects combustion products exiting the reactor vessel 411 for further recycling and/or other uses. In a particular embodiment, the combustion products 452 can include hot carbon monoxide, water vapor, and/or other constituents. One or more transmissive surfaces 419 are positioned between the reaction zone 412 (which can be disposed annularly around the passage 418) and an interior region 420 of the passage 418. The transmissive surface 419 can accordingly allow radiant energy and/or a chemical constituent to pass radially outwardly from the passage 418 into the reaction zone 412, as indicated by arrows B. By delivering the radiant energy (e.g., heat) and/or chemical constituent(s) provided by the flow of combustion products 452, the system 400 can enhance the reaction taking place in the reaction zone 412, for example, by increasing the reaction zone temperature and/or pressure, and therefore the reaction rate, and/or the thermodynamic efficiency of the reaction.

The system 400 can further include a controller 490 that receives input signals 491 (e.g., from sensors) and provides output signals 492 (e.g., control instructions) based at least in part on the inputs 491. Accordingly, the controller 490 can include suitable processor, memory and I/O capabilities. Thus, controller 490 may be connected to an ECU, such as ECU 112 or 212 discussed above with respect to FIGS. 1 and 2, thereby allowing the ECU to control the production of combustion modifier agents, such as the hydrogen supplied from collector 471$a$. Other TCR systems suitable for use with the disclosed technology are described in U.S. patent application Ser. No. 13/027,198, entitled COUPLED THERMOCHEMICAL REACTORS AND ENGINES, AND ASSOCIATED SYSTEMS AND METHODS, filed Feb. 14, 2011, the disclosure of which is incorporated herein by reference in its entirety.

Figure 4B:
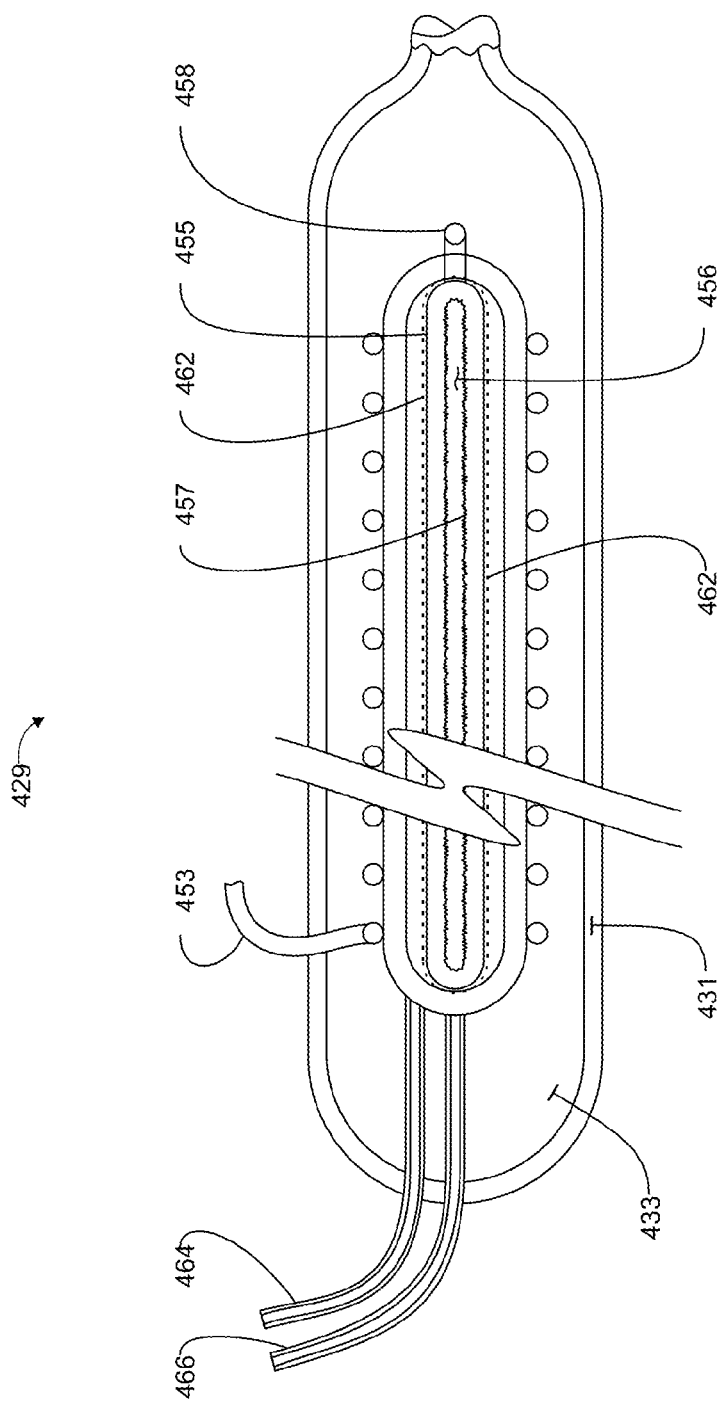
FIG. 4B is a schematic cross-sectional illustration of a suitable thermo chemical reactor system for hydrogen generation according to another representative embodiment.

FIG. 4B shows another TCR embodiment 429 may be located within representative exhaust manifold 431 of a combustion engine that receives fuel reactants such as natural gas or landfill methane and steam through inlet 453 that have been preheated by heat gained from suitable sources such as the engine coolant and/or exhaust gases 433. Embodiment 429 enables on-board production of one or more types of combustion modifiers from commonly available fuels and/or troublesome gases from sewage disposal, anaerobic decay or digestion processes such as ammonia and methane.

Such fuel mixtures may be further heated for the reaction typical to the endothermic process shown in qualitative process reactions summarized by Equations 1 and 2 within passageway 456 and/or on anode 457 by heat additions from resistive or inductive heater element 462 and/or by resistive heat generation by application of a suitable hydrogen separation voltage applied between cathode 458 and anode 457 through the wall of tube 455.

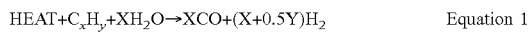

$$\text{HEAT} + C_xH_y + XH_2O \rightarrow XCO + (X+0.5Y)H_2 \qquad \text{Equation 1}$$

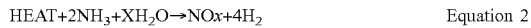

$$\text{HEAT} + 2NH_3 + XH_2O \rightarrow NOx + 4H_2 \qquad \text{Equation 2}$$

Tube 455 is made of material selections that selectively and immediately transport hydrogen ions or protons that are produced and that enable pressure addition to the hydrogen by galvanic impetus or pumping according to the voltage gradient in tube 455 between cathode 458 and anode 457. Materials suitable for this purpose include graphene composites with silicon carbide and/or graphite along with various pervoskite compositions such as (SrCeO3) oxide provide suitable media for such processes. Gases within passageway 168 that are heated to temperatures such as 800 to 1500° C. including hydrogen produced by reactions such as shown by Equations 1 or 2, can be separated at increased rates by doped perovskite-type oxides. Such enhanced proton conductivity is provided with membranes such as doped $SrCeO_3$, $CaZrO_3$, $BaCeO_3$ and/or $SrZrO_3$. Suitable dopants include yttrium, ytterbium, europium, samarium, neodymium, and gadolinium.

Hydrogen separation by such oxide ceramics can be further enhanced by an increased pressure gradient and/or by application of a DC bias. In embodiments that apply a DC bias or galvanic drive in the hydrogen separation process, the hydrogen can permeate from a lower hydrogen pressure on one side of the membrane to a higher hydrogen partial pressure on the other side of membrane 455.

Catalysts may be utilized at a reaction surface to influence surface exchange reactions such as various steps or the processes of Equations 1 or 2, and the hydrogen permeation can be enhanced by coating the membrane with a surface catalyst to reduce the activation energy for the surface exchange reactions. In particular embodiments, the selected anode material is also a favorable catalyst. Representative anodes for galvanic hydrogen pumps include porous films of Ni, Ag, Pt, and Ni/BCY porous layer. In such hydrogen pumping processes, the gas mixture in the anode and cathode zones compartments can include steam or be humidified with water vapor to improve the proton conductivity of the electrolyte and suppress its electronic conductivity.

The hydrogen separation rate increases as the applied current is increased in accordance with Faraday's law. Depending upon factors such as reactant pressure and temperature, dopant selection, membrane thickness, and humidity, the applied galvanic voltage gradients can have values in a representative range of from about 0.2 VDC to about 20 VDC, which are sufficient to produce and deliver from armored tube 431 through conduit 464 substantially higher pressure hydrogen such as 700 Bar (10,300 PSI) over the pressure within 456. Such net galvanic voltage gradients may be produced by much higher voltage AC or DC electricity delivered to the reactor heater assembly 458-455-457.

Thus various mixtures of reactants and products such as $H_2$ along with CO, $CO_2$, $H_2O$, NOx and/or $N_2$ in the anode zone can be separated to provide pressurized $H_2$ delivery at the cathode zone. Such hydrogen pressurization driven by an applied external voltage can move hydrogen from a suitably pressurized gas mixture including reactants and products to higher pressure for delivery for denser storage, enhanced capability of providing heat release upon expansion and/or higher activation capabilities for combustion modifier and injection purposes. The remaining pressurized gases delivered through conduit 466 that can provide expansive cooling can collected on the anode side of membrane 455 for injection and expansive cooling into the combustion chamber of an engine, e.g., before the piston reaches top dead center. Pressurized hydrogen can be delivered from the cathode side at higher pressure through conduit 464 into the combustion chamber after top dead center to produce an enhanced rate of combustion by expansive heating, in accordance with the Joule-Thompson heating effect, and thus perform increased combustion modifier activities such as expediting ignition and completion of combustion to produce higher fuel efficiency and reduction or elimination of objectionable emissions.

Other combustion modifiers such as oxides of nitrogen and/or oxygen serve as increased activity combustion modifiers and can be injected before TDC to cool the nitrogen (NOx) and/or oxygen that are injected into the combustion chamber can perform additionally gases undergoing compression to reduce back work for further improvement in brake mean effective pressure (BMEP) along with accelerated initiation and completion of combustion after TDC by the host engine.

Combustion modifiers such as oxygen, ozone, and/or oxides of nitrogen can be provided as enhanced activity agents and be more effective when presented as stratified oxidation agents within compressed air in a combustion chamber. Similarly presentation of stratified hydrogen within the combustion chamber which consumes such concentrated oxidants synergistically enhances the combustion modification capabilities of hydrogen and/or hydrogen donors such as ammonia or urea. Such capabilities are enabled by various combinations and permutations of combustion modifier presentations by the fuel injection and/or ignition embodiment 300.

Figure 5:
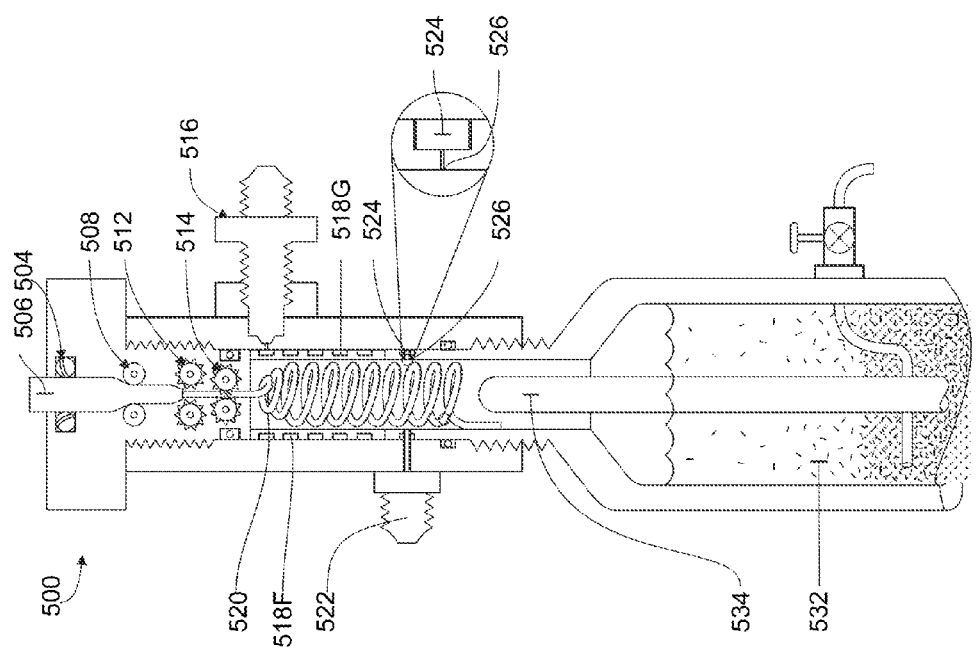
FIG. 5 is a schematic cross-sectional representation of a suitable apparatus for hydrogen generation according to a representative embodiment.

FIG. 5 illustrates a hydrogen generator 500, according to a representative embodiment, that is a suitable hydrogen source including self-pressurization for combustion modification uses with systems 100 and 200, described above. Equation 3 generally shows a representative process whereby substances, such as sodium, magnesium, calcium, aluminum, iron, carbon, and silicon (represented as "M") react to replace hydrogen in water to produce hydrogen and an oxide and/or one or more hydroxides of the "M".

$$\text{substance} + H_2O \rightarrow MO + H_2 + \text{HEAT} + \text{PRESSURE} \qquad \text{Equation 3}$$

In operation, a feed stock in a suitable form such as wire 506 is fed through a pressure seal 504 into one or more traction and activation pinch rollers such as 508, 512, and/or 514. This provides increased velocity of travel of the high surface-to-volume formed thin coil of aluminum 520 that may be corrugated and/or perforated by suitable forming and/or distressing rollers 512 and/or 514 to provide activation. The aluminum coil 520 is presented as a highly stressed and/or curled high surface-to-volume coil to steam that is produced by exothermic reaction heating of water that is supplied through fitting 522 to annular distributor 524 and injection ports such as 526.

System 500 can produce high pressure hydrogen for dense storage and/or to perform enhanced combustion modification purposes which is the product of intermittent cycles in which low pressure water is loaded and converted to high pressure hydrogen and/or by continuous delivery of high pressure water that is added through fitting 522. As a result of the exothermic reaction with aluminum, gaseous steam and hydrogen products are produced that occupy much greater volume than the liquid water and solid aluminum and further as a result of the greater number of moles of hydrogen per mole of aluminum consumed as shown in Equation 4.

$$Al+3H_2O \rightarrow Al(OH)_3+1.5H_2+HEAT \quad \text{Equation 4}$$

Hydrogen thus produced is filtered by suitable filter media 518F such as hydrophobic graphite foam, carbon, ceramic, or metal fibers compacted into a cylindrical body with collection passageways such as a helical annular groove or channel 518G on the outside diameter to feed filtered hydrogen to fitting 516 for delivery to applications utilizing the generated hydrogen, such as systems 100 and 200 described above.

An embodiment that provides very fast startup includes a suitable heating element such as 534, a portion of which is shown in FIG. 5, and/or heat that is transferred from the cooling system or exhaust gases of an engine, for example. This provides rapid heating of media 532 and/or steam in the upper reaction zone to 100° C. (212° F.) or higher for quickly enabling rapid production of pressurized hydrogen. After reaching suitable reaction rate, heat transfers such as may be supplied by heating element 534 are shut off as the reaction is exothermic and autogenously continues to produce pressurized hydrogen and heat as summarized by Equations 3 or 4. The hydrogen can initially be produced from waste aluminum such as cans, machine shop cuttings, etc., and caustic solutions such as can be made from a supply of dry Drano® or NaOH Lye and/or from KOH and/or from water and wood ashes.

Upon heating the catalytic sodium and/or potassium hydroxide 532, the reaction of aluminum proceeds at a high rate of continued hydrogen production and additional heat is released. Upon reaching a sufficiently high temperature, the carbon reacts with the steam, releasing carbon monoxide and/or carbon dioxide. Thus, depending upon the desired gas delivery from fitting 516, embodiment 500 can be controlled with operating temperature to control the amount and type of pressurized gas supplied from fitting 516. The rate of hydrogen production is controlled by control of the rate that water is added through fitting 522 and/or the rate that reactant 506 is fed into reactor 500 and/or the temperature of operation as a function of the heat removal rate from the assembly.

Also disclosed herein are methods of characterizing fuels for improved operation of an internal combustion engine. The methods may include any procedural step inherent in the above described structures and systems. In a representative embodiment, the method comprises direct injecting a first fuel, such as natural gas, into a cylinder of the engine with an injector-igniter; providing the engine with a combustion modifier agent, such as hydrogen, in a first amount effective to improve the combustion properties of the first fuel; and igniting the first fuel with the injector-igniter. The method may further comprise direct injecting a second fuel different from the first, such as diesel, into the cylinder and providing the engine with the combustion modifier agent in a second amount effective to improve the combustion properties of the second fuel. In one embodiment, the method includes mixing the first fuel and combustion modifier agent prior to direct injecting the first fuel. In other embodiments, the combustion modifier agent and fuel are direct injected into the cylinder independently of each other.

From the foregoing it will be appreciated that, although specific embodiments of the technology have been described herein for purposes of illustration, various modifications may be made without deviating from the spirit and scope of the technology. Further, certain aspects of the new technology described in the context of particular embodiments may be combined or eliminated in other embodiments. Moreover, while advantages associated with certain embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein. The following examples provide additional embodiments of the present technology.

EXAMPLES

1. A fuel system with fuel characterization, comprising:
a combustion modifier source capable of supplying a combustion modifier agent;
a fuel tank capable of storing a fuel; and
an injector operative to inject the fuel and a proportionate amount of the modifier agent into a cylinder of an internal combustion engine.

2. The system according to example 1, further comprising a mixing valve operative to proportionately mix the fuel and modifier agent.

3. The system according to example 1, wherein the injector includes a first channel configured to inject the modifier agent.

4. The system according to example 3, wherein the injector includes a second channel configured to inject the fuel, wherein the second channel is separate from the first channel.

5. The system according to example 1, wherein the injector is an injector-igniter.

6. The system according to example 1, wherein the combustion modifier source comprises a tank containing hydrogen.

7. The system according to example 1, wherein the combustion modifier source comprises a thermo-chemical reactor.

8. The system according to example 1, further comprising an engine control unit operatively connectable to the combustion modifier source and the injector.

9. A vehicular fuel system with onboard fuel characterization, comprising:
a combustion modifier source capable of supplying a combustion modifier agent;
a fuel tank capable of storing a fuel;
an injector-igniter operative to direct inject the fuel and a proportionate amount of the modifier agent into a cylinder of an internal combustion engine; and
an engine control unit operatively connectable to the combustion modifier source and the injector.

10. The system according to example 9, further comprising a mixing valve operative to proportionately mix the fuel and modifier agent.

11. The system according to example 9, wherein the injector includes a first channel configured to inject the modifier agent.

12. The system according to example 11, wherein the injector includes a second channel configured to inject the fuel, wherein the second channel is separate from the first channel.

13. The system according to example 9, wherein the combustion modifier source is adapted for mounting onboard a vehicle.

14. The system according to example 13, wherein the combustion modifier source comprises a tank containing hydrogen.

15. The system according to example 13, wherein the combustion modifier source comprises a thermo-chemical reactor.

16. A method of characterizing fuels for improved operation of an internal combustion engine, the method comprising:
direct injecting a first fuel into a cylinder of the engine with an injector-igniter;
providing the engine with a combustion modifier agent in a first amount effective to improve the combustion properties of the first fuel; and
igniting the first fuel with the injector-igniter.

17. The method according to example 16, further comprising direct injecting a second fuel different from the first into the cylinder and providing the engine with the combustion modifier agent in a second amount effective to improve the combustion properties of the second fuel.

18. The method according to example 16, further comprising mixing the first fuel and combustion modifier agent prior to direct injecting the first fuel.

19. The method according to example 16, further comprising direct injecting the combustion modifier agent into the cylinder independently of the first fuel.

20. The method according to example 16, wherein the combustion modifier agent comprises hydrogen.

I claim:

1. A fuel system with fuel characterization, comprising:
a thermo-chemical regenerative reactor comprising,
a reactor vessel positioned within an exhaust manifold and having an inlet for receiving fuel reactants to be preheated by exhaust gases within the exhaust manifold, and
a fluid network extending through the reactor vessel having fluid flow, wherein a combustion modifier agent is produced in the fluid network via heating provided by an inductive heater element positioned within the fluid network;
a fuel tank to store a fuel; and
an injector operatively connected to the fuel tank and the fluid network of the thermo-chemical regenerative reactor to inject the fuel and a proportionate amount of the combustion modifier agent into a cylinder of an internal combustion engine;
wherein the injector includes a first channel configured to inject the modifier agent and a second channel configured to inject the fuel, wherein the second channel is separate from the first channel.

2. The system according to claim 1, wherein the injector is an injector-igniter.

3. The system according to claim 1, wherein the combustion modifier agent comprises hydrogen.

4. The system according to claim 1, further comprising an engine control unit operatively connectable to the thermo-chemical reactor and the injector.

5. A fuel system with fuel characterization, comprising:
a thermo-chemical regenerative reactor positioned within an exhaust manifold and having an inlet for receiving fuel reactants to be preheated by exhaust gases within the exhaust manifold comprising,
a reactor vessel, and
a fluid network extending through the reactor vessel having fluid flow, wherein a combustion modifier agent is produced in the fluid network via heating provided by resistive heat generation by application of voltage applied between a cathode and anode through a wall of a tube within the fluid network;
a fuel tank to store a fuel;
an injector operatively connected to the fuel tank and the fluid network of the thermo-chemical regenerative reactor to direct inject the fuel and a proportionate amount of the combustion modifier agent into a cylinder of an internal combustion engine; and
an engine control unit operatively connectable to the thermo-chemical reactor and the injector.

6. The system according to claim 5, further comprising a mixing valve operative to proportionately mix the fuel and modifier agent.

7. The system according to claim 5, wherein the injector includes a first channel configured to inject the modifier agent.

8. The system according to claim 7, wherein the injector includes a second channel configured to inject the fuel, wherein the second channel is separate from the first channel.

9. The system according to claim 5, wherein the thermo-chemical reactor is adapted for mounting onboard a vehicle.

10. The system according to claim 9, wherein the combustion modifier agent comprises hydrogen.

11. A method of characterizing fuels for improved operation of an internal combustion engine, the method comprising:
direct injecting a first fuel into a cylinder of the engine with an injector-igniter;
generating a combustion modifier agent with a thermo-chemical reactor positioned within an exhaust manifold;
providing the engine with the combustion modifier agent in a first amount effective to improve the combustion properties of the first fuel; and
igniting the first fuel with the injector-igniter.

12. The method according to claim 11, further comprising direct injecting a second fuel different from the first into the cylinder and providing the engine with the combustion modifier agent in a second amount effective to improve the combustion properties of the second fuel.

13. The method according to claim 11, further comprising mixing the first fuel and combustion modifier agent prior to direct injecting the first fuel.

14. The method according to claim 11, further comprising direct injecting the combustion modifier agent into the cylinder independently of the first fuel.

15. The method according to claim 11, wherein the combustion modifier agent comprises hydrogen.

* * * * *